Patented Mar. 15, 1938

2,110,871

UNITED STATES PATENT OFFICE 2,110,871

METHOD OF PRESERVING CITRUS FRUIT

Francisco Espaillat de la Mota, Kingston, Jamaica, British West Indies

No Drawing. Application May 6, 1936,
Serial No. 78,290

1 Claim. (Cl. 99—156)

This invention relates to a method of preserving citrus fruit and one object of the invention is to so preserve the fruit that it may be kept for a long period of time without being in cold storage and thus not only prevent losses due to the fruit becoming spoiled after being removed from cold storage but also eliminate the need for cold storage and thereby reduce the cost of storing the fruit and the cost of shipping it from one place to another.

Another object of the invention is to so preserve the fruit that it will be formed with a hard shell-like skin serving to exclude air from the fruit and thereby maintaining the pulp in a soft and juicy state that it may be eaten.

Another object of the invention is to remove a certain percentage of moisture from the fruit during the preserving operation and thus reduce the weight of the fruit and, at the same time, causing the sweetness of the fruit to be increased and the fruit caused to be very pleasing to the taste when eaten.

Another object of the invention is to so preserve the fruit that an orange or the like may be cut in halves and the pulp and juice eaten with a spoon, or, if so desired, the fruit soaked in water for a short time before being eaten and thus return the hardened skin to its initial condition and permit the fruit to be peeled and eaten.

This improved method of preserving citrus fruit consists, briefly, of removing the outer oil bearing portion of the rind for the major portion of the thickness thereof, drying the fruit to evaporate moisture and harden the rind by exposing the fruit to the action of air and sunshine, placing the dried fruit in a desiccating bath and again drying the fruit by exposing it to air and sunshine to form a brittle shell of the rind and then treating the hardened brittle rind with a solution consisting of alcohol and essential oils of the fruit obtained from the initially removed outer portion of the rind.

The citrus fruit which is to be preserved must be thoroughly ripe and picked from the trees without being bruised. After the fruit has been picked from the trees, it is decorticated with a knife or other suitable tool or grated. During this operation, the outer oil bearing portion of the rind is removed for practically its entire depth but a slight amount of the outer oil bearing portion of the rind will be left in place. The decorticated fruit is then exposed to sun and air for several days which causes the skin to harden and also causes a certain percentage of the moisture to evaporate and the juice thicken. This does not reduce the sugar content of the fruit and, therefore, the pulp and juice will be sweeter than it was in its initial condition. Instead of exposing the fruit to sun and air, it can be dried in an oven or the fruit placed in crates and the crates put in a steam room. During this drying and evaporating step, the fruit loses about twenty or twenty-five percent of its weight. The dried fruit is then immersed in a liquid formed of silicate of soda, benzoate of soda and water and coloring matter added to impart a natural tint to the rind. The fruit remains in this desiccating bath for some time. Instead of using a desiccating bath formed of the ingredients set forth above, formalin, salycilic acid, boric acid, or zinc chloride, or any other suitable preservative may be used in place of the benzoate of soda. After being removed from the desiccating bath, the fruit is again exposed to sun and air for two or three days or more and it will be found that the skin has not only hardened but become brittle. This brittle rind, which may be referred to as a shell, entirely encloses the pulp and prevents air from reaching the pulp and causing the fruit to spoil or become dried to such an extent that it is not palatable. The surface of the dry shell is then polished with a sheet of fine emery paper which imparts a smooth finish to the shell and the shell then treated with a solution consisting of alcohol and essential oils of the fruit which are obtained from the initially removed outer portion of the rind. This mixture of alcohol and oils aids in preserving the shell and preventing air from passing inwardly through pores of the rind. The fruit is then wrapped in thin tissue paper known as "silk paper" and packed in crates of a standard construction. The fruit so treated will be preserved for a long time and will not spoil. When it is to be eaten, it may be cut into halves and the pulp and juice eaten with a spoon or the fruit may be placed in water for a short period of time which will cause the dried rind to soften and return to practically its initial state in which it may be removed in the usual manner by peeling and the pulp eaten. In view of the fact that a portion of the moisture is evaporated from the fruit, the juice and pulp remaining will be of increased sweetness and very pleasant to the taste.

Having thus described the invention, what is claimed as new is:

The method of preserving citrus fruit consisting of decorticating the fruit by removing the outer oil bearing portion of the rind for approximately the thickness thereof, subjecting the decorticated fruit to heat to evaporate moisture and harden the rind, soaking the fruit in a bath consisting of silicate of soda, a preservative of the class consisting of benzoate of soda, formalin, salycilic acid, boric acid and zinc chloride, and water, removing the fruit from the bath and again subjecting it to heat to evaporate moisture and form a dry brittle shell of the rind, and applying to the brittle shell a solution consisting of alcohol and essential oil of the fruit.

FRANCISCO ESPAILLAT DE LA MOTA.